United States Patent
Kim et al.

(10) Patent No.: US 10,705,534 B2
(45) Date of Patent: Jul. 7, 2020

(54) SYSTEM AND METHOD FOR GROUND PLANE DETECTION

(71) Applicant: Faraday&Future Inc., Gardena, CA (US)

(72) Inventors: Dae Jin Kim, Rancho Palos Verdes, CA (US); Aziz Umit Batur, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/957,889

(22) Filed: Apr. 19, 2018

(65) Prior Publication Data

US 2019/0324471 A1    Oct. 24, 2019

(51) Int. Cl.

| | | |
|---|---|---|
| *G01S 17/93* | (2020.01) | |
| *G01S 17/42* | (2006.01) | |
| *G01S 17/02* | (2020.01) | |
| *G01S 7/481* | (2006.01) | |
| *G01S 7/48* | (2006.01) | |
| *G01S 17/06* | (2006.01) | |
| *G01S 17/66* | (2006.01) | |
| *G01S 17/89* | (2020.01) | |
| *G01S 7/484* | (2006.01) | |
| *G01S 7/491* | (2020.01) | |
| *G05D 1/00* | (2006.01) | |
| *G05D 1/02* | (2020.01) | |
| *G06K 9/00* | (2006.01) | |
| *G06K 9/46* | (2006.01) | |
| *G06K 9/62* | (2006.01) | |
| *G06K 9/78* | (2006.01) | |
| *G01S 13/93* | (2020.01) | |
| *G01S 13/90* | (2006.01) | |
| *G08G 1/16* | (2006.01) | |
| *G01S 17/931* | (2020.01) | |

(52) U.S. Cl.
CPC ............ *G05D 1/0238* (2013.01); *G01S 17/42* (2013.01); *G01S 17/89* (2013.01); *G01S 17/931* (2020.01); *G08G 1/16* (2013.01); *G05D 1/0088* (2013.01)

(58) Field of Classification Search
USPC .......................................................... 701/28
See application file for complete search history.

(56) References Cited

U.S. PATENT DOCUMENTS

| | | | | |
|---|---|---|---|---|
| 2018/0113200 A1* | 4/2018 | Steinberg | ............... | G08G 1/166 |
| 2018/0113210 A1* | 4/2018 | Izadian | .................. | G01S 13/42 |
| 2019/0056748 A1* | 2/2019 | Budihal | .................... | G06T 7/11 |
| 2019/0086550 A1* | 3/2019 | Dussan | ............. | G02B 19/0028 |

\* cited by examiner

*Primary Examiner* — Adam D Tissot
*Assistant Examiner* — Laura E Linhardt

(57) ABSTRACT

Improved processing of sensor data (e.g., LiDAR data) can be used to distinguish between free space and objects/hazards. Autonomous vehicles can use such information for performing autonomous driving and/or parking operations. LiDAR data can include a plurality of range measurements (e.g., forming a 3D point cloud). Each of the range measurements can correspond to a respective LiDAR channel and azimuth angle. The processing of LiDAR data can include identifying one or more of the plurality of range measurements as ground points or non-ground points based on one or more point criteria. The one or more point criteria can include a ground projection criterion and an angular variation criterion.

15 Claims, 5 Drawing Sheets

SYSTEM AND METHOD FOR GROUND PLANE DETECTION

FIELD OF THE DISCLOSURE

This relates generally to a Light Imaging, Detection, And Ranging ("LiDAR") system, and more particularly to processing data from a LiDAR system to detect ground and/or free space.

BACKGROUND OF THE DISCLOSURE

Modern vehicles, especially automobiles, increasingly use systems and sensors for detecting and gathering information about the vehicle's surroundings. Autonomous vehicles can use such information for performing autonomous, partially autonomous, and driver assistance driving and/or parking operations. Many autonomous, semi-autonomous, and driver assistance driving and/or parking operations rely on cooperation from a multitude of sensors including cameras, LiDAR sensors, and ultrasonic sensors, among others. The data from one or more of the sensors can be used to map the environment. This mapping can be used to determine whether the space in the direction of navigation is unoccupied (e.g., free-space) or occupied by objects or hazards (e.g., vehicles, walls, pedestrians, potholes, etc.). Knowledge of the environment can allow for an autonomous or partially autonomous vehicle to navigate without colliding with objects or other hazards. LiDAR sensors can be particularly useful for mapping the environment (e.g., by generating a three-dimensional point cloud) because laser range measurements are particularly accurate and can be generated with reasonable speed required for autonomous or partial autonomous operations. Conventionally, LiDAR data can be processed using height thresholding, where objects can be classified as objects/hazards based on their height relative to the vehicle ground. However, even with a well calibrated setup (with a known geometric relationship between LiDAR sensor coordinates and vehicle coordinates, and which can be eventually extended further into a real-world coordinate system), conventional techniques such as height thresholding cannot reliably differentiate between ground/free space and objects/hazards due to real-world environmental conditions including the fluctuation of LiDAR coordinate system cause by dynamic motion of the vehicle during navigation and non-flat driving surfaces roads (varying slopes, pots holes, dips, speed bumps, etc.). Improved processing to distinguish between free space and objects/hazards is required.

SUMMARY OF THE DISCLOSURE

The present invention relates to system and method for improved processing of sensor data (e.g., LiDAR data) to distinguish between free space and objects/hazards. Autonomous vehicles can use such information for performing autonomous driving and/or parking operations. LiDAR data can include a plurality of range measurements (e.g., forming a 3D point cloud). Each of the range measurements can correspond to a respective LiDAR channel and azimuth angle. The processing of LiDAR data can include identifying one or more of the plurality of range measurements as ground points or non-ground points based on one or more point criteria. The one or more point criteria can include a ground projection criterion and an angular variation criterion.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples.

Figure 1:
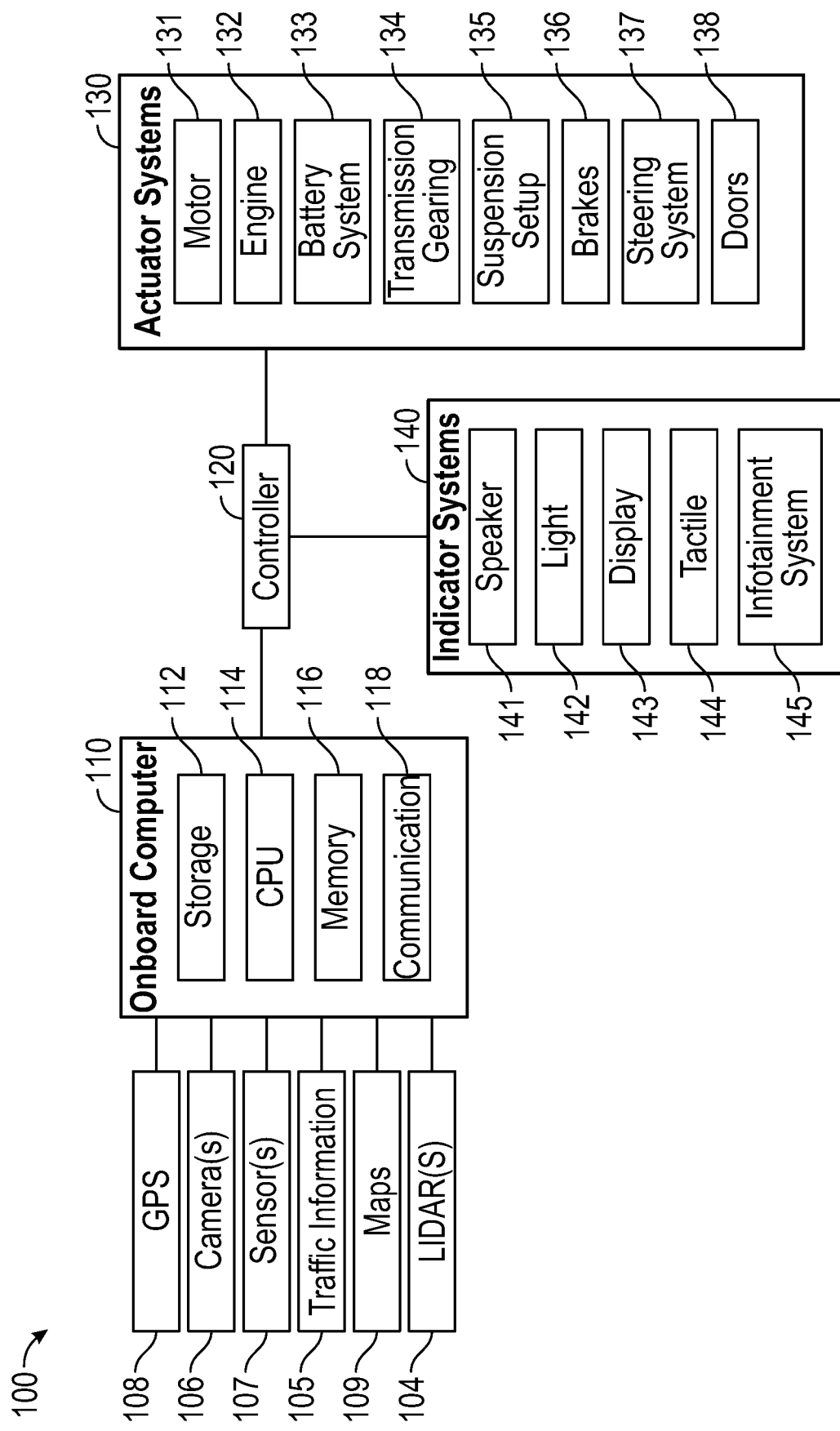
FIG. 1 illustrates an exemplary system block diagram of a vehicle control system that can incorporate a LiDAR system according to examples of the disclosure.

FIG. 1 illustrates an exemplary system block diagram of a vehicle control system that can incorporate a LiDAR system according to examples of the disclosure. System 100 can be incorporated into a vehicle, such as a consumer automobile. Other example vehicles that may incorporate the system 100 include, without limitation, airplanes, boats, motorcycles or industrial automobiles. Vehicle control system 100 can include one or more cameras 106 capable of capturing image data (e.g., video data) for determining various characteristics of the vehicle's surroundings. Vehicle control system 100 can include one or more LiDAR sensors 104 as described herein. Vehicle control system 100 can also include one or more other sensors 107 (e.g., radar, ultrasonic, IMU, etc.) capable of detecting various characteristics of the vehicle's surroundings. For example, LiDAR sensor 104, cameras 106 and/or sensors 107 can be used for detecting the presence of objects, such as other vehicles, pedestrians or obstacles within the detection range of LiDAR sensor 104, camera 106 and/or sensors 107. Global Positioning System (GPS) receiver 108 can be capable of determining the location of the vehicle. In some examples, traffic information 105 and maps 109 can be received (e.g., by an antenna) or accessed (e.g., from storage 112 or memory 116), and can be used, for example, for determining automated driving routes. Maps 109 can be high-definition maps, which optionally can include information about some stationary objects (presence, type and/or location of traffic lights, speed bumps, dips, curbs, etc.).

Vehicle control system 100 can include an on-board computer 110 coupled to the LiDAR sensor 104, traffic information 105, cameras 106, sensors 107, GPS receiver 108, and maps 109. On-board computer 110 can be capable of receiving one or more of the traffic information, image data from the cameras, LiDAR data from the LiDAR sensor(s), outputs from the sensors 107 and the GPS receiver 108, and maps 109. It should be noted that sensor data from multiple sensors can be fused together (e.g., LiDAR data, RADAR data, ultrasonic sensor data, camera data, inertial measurement unit (IMU) data etc.). This fusion can occur at one or more electronic control units (ECUs) of on-board computer 110. The one or more ECUs that are chosen to perform data fusion can be based on an amount of resources (e.g., processing power and/or memory) available to the one or more ECUs, and can be dynamically shifted between ECUs and/or components within an ECU (since an ECU can contain more than one processor) to optimize performance (e.g., performance of autonomous driving and parking maneuvers).

On-board computer 110 can include storage 112, memory 116, and a processor (central processing unit (CPU)) 114. CPU 114 can execute autonomous driving software stored in storage 112 and/or memory 114. For example, CPU 114 can process some or all of the traffic information, image data, sensor outputs, GPS outputs, and maps, and make driving decisions based thereon. For example, processing can include detecting and tracking objects in the environment, tracking vehicle parameters (e.g., odometry, location), navigation planning, lane selection/change planning, motion planning, determining automated driving and/or autonomous parking commands, etc. CPU 114 (or another processor in vehicle 100) can also process some or all of the image data (e.g., including LiDAR data) from the various sensors to detect free space and ground, and take action based on detecting free space and ground, as discussed in more detail herein (e.g., with reference to FIGS. 2A-6C).

Additionally, storage 112 and/or memory 116 can store data and instructions for performing the above processing. In particular, storage 112 and/or memory 116 can used for storing and processing data to detect free space and ground. Storage 112 and/or memory 116 can be any non-transitory computer readable storage medium, such as a solid-state drive, a hard disk drive or a random access memory (RAM) among other possibilities. Additionally, on-board computer 110 can include communication interface 118, which can enable or perform communication between components of on-board computer 110, between on-board computer 110 and other components of vehicle control system 100, or between on-board computer 110 and other external systems.

The vehicle control system 100 can also include a controller 120 capable of controlling one or more aspects of vehicle operation based on automated driving and/or parking commands received from the processor. In some examples, the vehicle control system 100 can be connected (e.g., via controller 120) to one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137, and door system 138. The vehicle control system 100 can control, via controller 120, one or more of these actuator systems 130 during vehicle operation; for example, to open or close one or more of the doors of the vehicle using the door actuator system 138, to control the vehicle during autonomous driving or parking operations using the motor 131 or engine 132, battery system 133, transmission gearing 134, suspension setup 135, brakes 136 and/or steering system 137, door system 138, etc. Actuator systems 130 can also include sensors that send dead reckoning information (e.g., steering information, speed information, etc.) to on-board computer 110 (e.g., via controller 120) to estimate the vehicle's position and orientation. It should be understood that autonomous driving described herein is not limited to fully autonomous driving systems; autonomous driving can include fully or partially autonomous driving, and/or driver assistance systems.

The one or more indicator systems 140 can include, but are not limited to, one or more speakers 141 (e.g., as part of an entertainment system in the vehicle), one or more lights 142 in the vehicle, one or more displays 143 in the vehicle, one or more tactile actuators 144 in the vehicle (e.g., as part of a steering wheel or seat in the vehicle), and one or more infotainment systems 145 (e.g., providing entertainment and/or information to the user). The vehicle control system 100 can control, via controller 120, one or more of these indicator systems 140 to provide indications to a user of the vehicle.

Figure 2A:
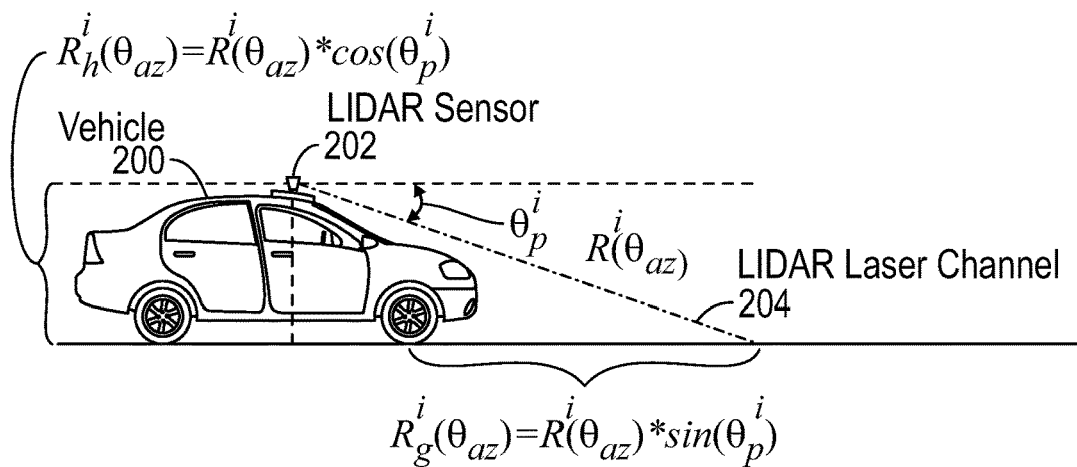
FIGS. 2A-2B illustrate views of a scanning LiDAR sensor configuration according to examples of the disclosure.
Figure 2B:
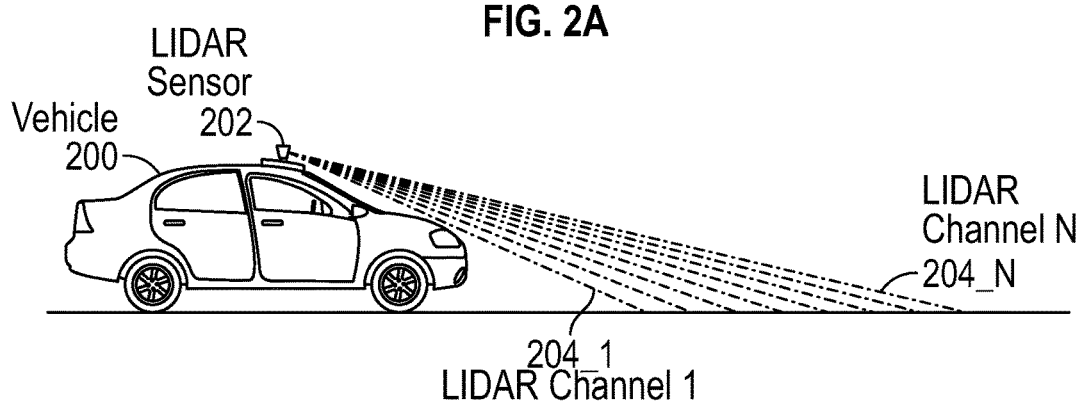

FIGS. 2A-2B illustrate views of a scanning LiDAR sensor configuration according to examples of the disclosure. FIGS. 2A-2B illustrate a scanning LiDAR sensor 202 that can be mounted on the hood or roof of vehicle 200, or can otherwise be attached to and/or integrated with a portion of a vehicle chassis. Scanning LiDAR sensor 202 can include one or more laser light channels (LiDAR channels) 204. Each LiDAR channel can correspond to a laser light source in scanning LiDAR sensor 202 with a corresponding pitch angle, $\theta_p^i$, where i can represent the LiDAR channel. In some examples, the scanning LiDAR sensor 202 can include 4-128 channels. In some examples, the scanning LiDAR sensor 202 can include 16 channels, 32 channels or 64 channels. In some examples, one or more LiDAR channels can be pointing in an upward direction (e.g., to detect overhead clearances, vehicles that are taller than vehicle 200, or any other object that might be located above the vehicle), one or more LiDAR channels can be pointing in a downward direction (e.g., to detect objects that are likely to be near to the ground, such as speed bumps, potholes, small children, pets, or any other low object), and one or more LiDAR channels can be pointed in between to detect objects in the path or surroundings (e.g., other vehicles, structures, barriers, pedestrians, cyclists, etc.) The total number of laser light beams, the distribution of light beams in different directions, and the orientation of the light beams can vary from the illustrations and descriptions of the figures while still remaining within the scope of the disclosure.

Scanning LiDAR sensor 202 can rotate by a rotation angle to enable each LiDAR channel to scan an arc (e.g., capture ranging measurements along the arc). In some examples, the laser light source for each LiDAR channel can rotate 180 degrees or 360 degrees (or a different scanning range). In some examples, each LiDAR channel sweeps the same angle. In some examples, different LiDAR channels may sweep different angles. The scanning LiDAR sensor 202 can be attached to a motor via a shaft. A position encoder (e.g., an encoder wheel) can be used to determine the rotational position of LiDAR channels, and the rotational position of the mirror can be used to determine the azimuth angle, $\theta_{az}$, as the laser light source transmits laser beams along the arc. In some examples, each laser light source can provide continuous laser illumination. In other examples, each laser light source can provide pulses of illumination. In some examples, timing of the laser light pulses for a pulsed lased light source can be controllable.

In some examples, rather than rotating the laser light sources, scanning LiDAR sensor 202 can include one or more rotatable mirrors, and the laser light sources can each be pointed toward the rotatable mirror (which can be attached by a shaft to a motor). The position encoder can be used to determine the rotational position of the mirror, and the rotational position of the mirror can be used to determine the direction that the mirror is pointing along the arc.

As described herein, in some examples, each LiDAR channel 204 can transmit a laser beam. When the transmitted beam encounters an object (or ground), a portion of the transmitted light can reflect from the object and return toward a corresponding light sensor in the scanning LiDAR sensor 202. The light sensor can be a silicon photodiode, avalanche photodiode, photomultiplier, or other photoelectric sensor that can detect the reflected laser light. In some examples, the light source and the light sensor can be integrated into the same unit. In some examples, the light source and the light sensor can be implemented into different units. In some examples, one light sensor can be provided for each beam transmitted from the laser light source (i.e., one light source and light sensor pair per LiDAR channel). In some examples, a beam splitter can be used to redirect the reflected beam toward the light sensor.

A range can be determined by measuring a time of flight of the reflected beam or by other ranging techniques. The range can be determined for each LiDAR channel along the arc swept by the LiDAR channel. The determined range can be a function of the pitch angle of the laser light source of the LiDAR channel and the azimuth angle along the arc swept by the LiDAR channel. For example, each range measurement for LiDAR channel can be represented as $R_{(\theta_{az})}^i$, where i can represent the LiDAR channel (with a corresponding pitch angle, $\theta_p^i$ and $\theta_{az}$ can represent the azimuth angle.

FIG. 2A illustrates a single channel, LiDAR channel 204. By taking measurements at multiple azimuth angles along an arc, an image of objects can be produced for the arc. In some examples, the image can correspond to a specific height above a road (e.g., assuming a perfectly flat ground). In some examples, the pitch angle can be adjusted and the LiDAR channel can sweep one or more additional arcs. In this way, the scanning LiDAR sensor 202 can map the environment at different heights to detect the position and distance of objects within the scan area of the scanning LiDAR sensor. In some examples, as illustrated in FIG. 2B, multiple LiDAR channels 204_1 to 204_N can be used to sweep different arcs in parallel in order to enable faster mapping of the environment (which can enable improved performance for autonomous navigation).

Figure 3A:
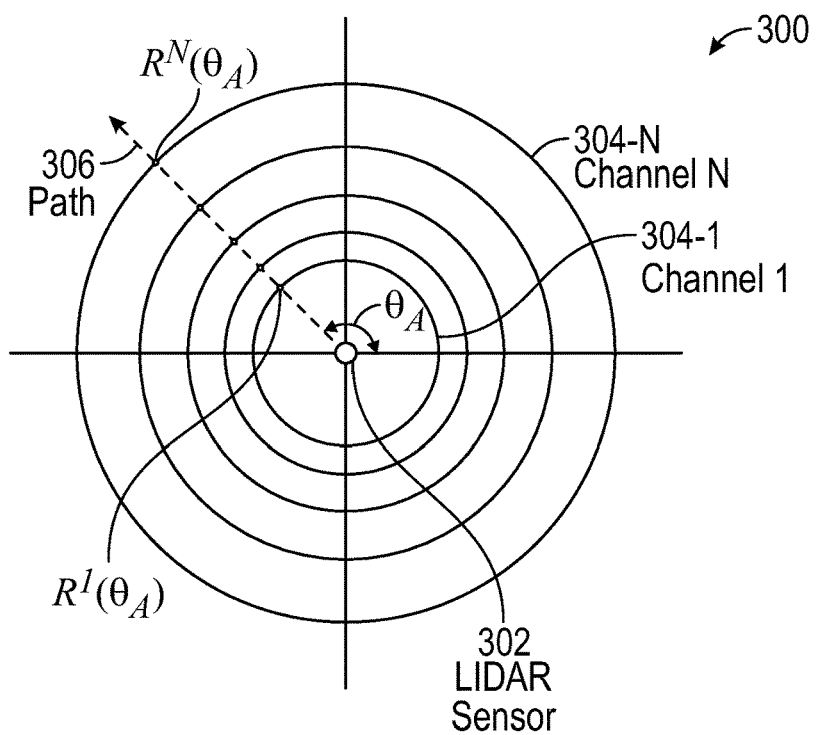
FIG. 3A illustrates a top view of arcs swept by LiDAR channels of a scanning LiDAR sensor according to examples of the disclosure.

FIG. 3A illustrates a top view 300 of arcs swept by LiDAR channels of a scanning LiDAR sensor according to examples of the disclosure. LiDAR sensor 302 (e.g., corresponding to LiDAR sensor 202) can transmit laser light beams for each of multiple LiDAR channels 304_1 to 304_N (e.g., corresponding to LiDAR channels 204_1 to 204_N). As illustrated in top view 300, the channels can be indexed such that channel 1 is most proximate and channel N most distant. As discussed herein, the measures for each LiDAR channel can be indexed according to azimuth angle. FIG. 3A illustrates measurements along path 306 corresponding to a particular azimuth angle, $\theta_A$ (i.e., $\theta_{az}=\theta_A$). The path can include the measurements $R_{\theta_A}^1$ to $R_{\theta_A}^N$ for LiDAR channels 1 to N for an azimuth angle $\theta_A$. Although FIG. 3A illustrates only one path, it should be understood that additional paths may be formed as the LiDAR sweeps across the arc. Additionally, although 360 degree arcs are shown in FIG. 3A, smaller arcs may be scanned in some examples (e.g., 180 degrees).

Figure 3B:
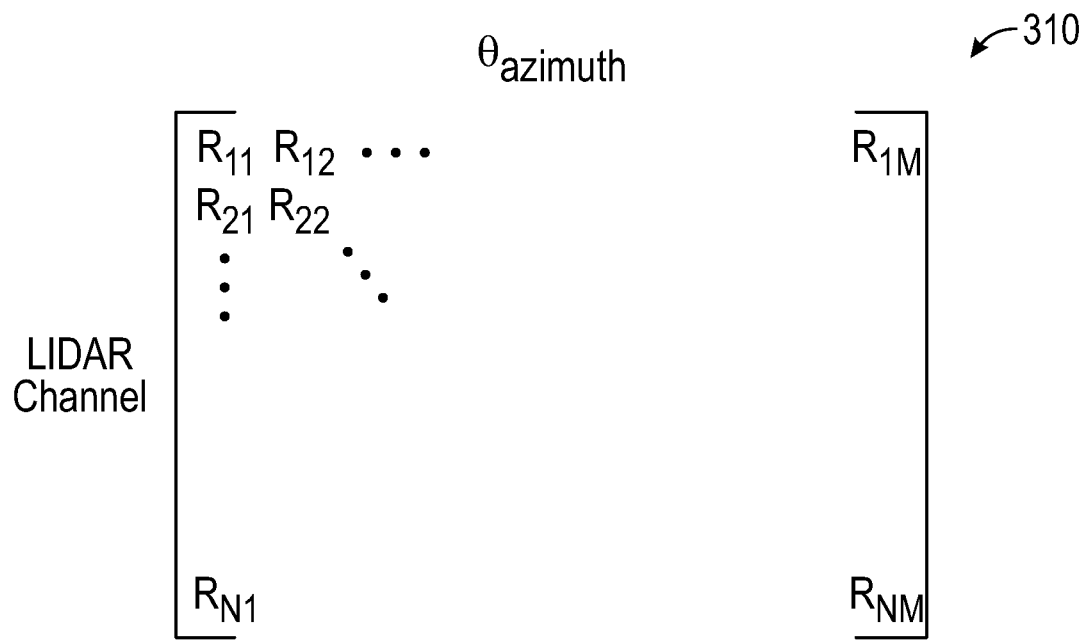
FIG. 3B illustrates an exemplary representation of LiDAR data according to examples of the disclosure.

FIG. 3B illustrates an exemplary representation of LiDAR data (e.g., measured by the scanning LiDAR sensor 202, 302) according to examples of the disclosure. The data can be represented as an N×M matrix 310 including range measurement entries $R_{11}$ to $R_{NM}$, which can be indexed according to LiDAR channel and azimuth angle. In this representation, each column of matrix 310 can correspond to a path (e.g., such as path 306) and each row can correspond to the measurements along an arc by a LiDAR channel.

As described herein, in an idealized environment (e.g., perfectly flat ground, no fluctuation of the LiDAR coordinate system), each arc scanned by the scanning LiDAR system can correspond to a different height, thereby allowing for height thresholding to be used to reliably distinguish between the ground and objects/hazards. Under real-world environmental conditions—including the fluctuation of LiDAR coordinate system caused by dynamic motion of the vehicle during navigation and non-flat driving surfaces roads (varying slopes, pots holes, dips, speed bumps, etc.)— additional processing may be required to reliably and quickly distinguish between the ground and objects/hazards. One of the advantages of the processing described herein is robust and reliable discrimination between ground and objects/hazards.

Figure 4:
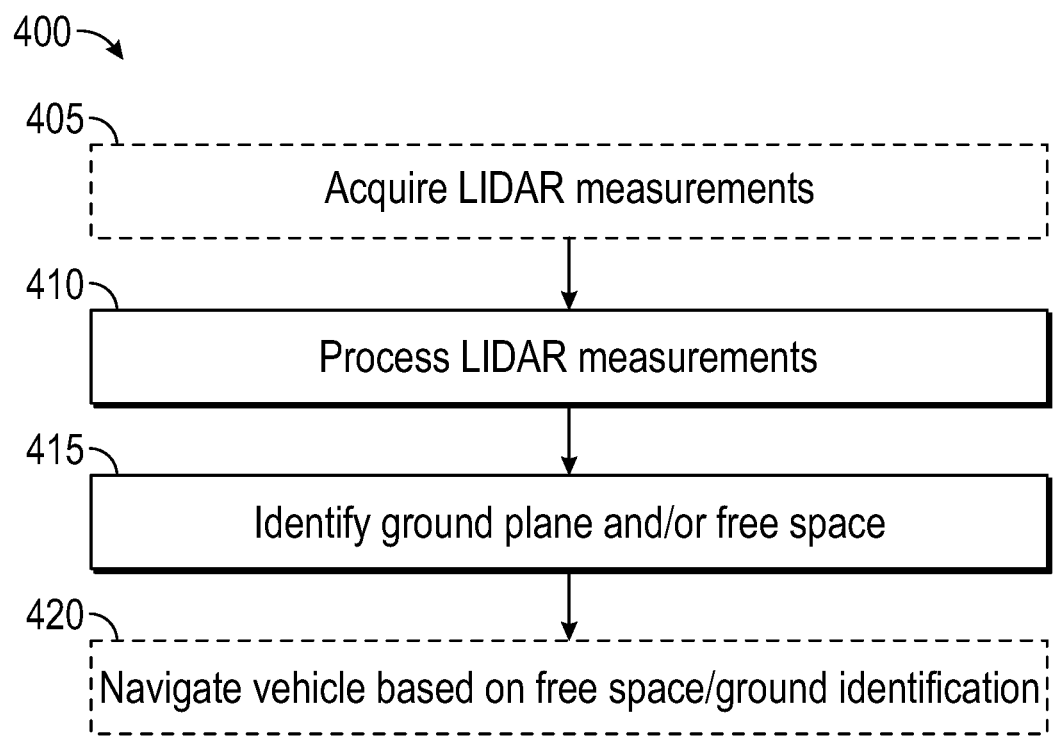
FIG. 4 illustrates an exemplary process of processing LiDAR data to detect ground and/or free space according to examples of the disclosure.

FIG. 4 illustrates an exemplary process 400 of processing LiDAR data to detect ground and/or free space according to examples of the disclosure. Process 405 can begin at 405 with acquiring LiDAR data measured by a scanning LiDAR sensor (e.g., LiDAR sensors 104, scanning LiDAR sensor 202, 302). In some examples, the LiDAR data can be stored in storage 112. At 410, the LiDAR data can be processed (e.g., by CPU 114 of on-board computer 110). The details of LiDAR data processing are explained in more detail with respect to FIG. 5 below. At 415, ground plane and/or free space can be identified (e.g., by CPU 114 of on-board computer 110). The identified ground plane and/or free space can be used to generate navigation commands. At 420, the vehicle can navigate based on the identified ground plane and/or free space using the navigation commands. For example, the vehicle may stop or turn to avoid colliding with hazards in the path of the vehicle. The vehicle may proceed with autonomous driving and/or parking commands when the path of the vehicle is free space clear of hazards/objects.

Figure 5:
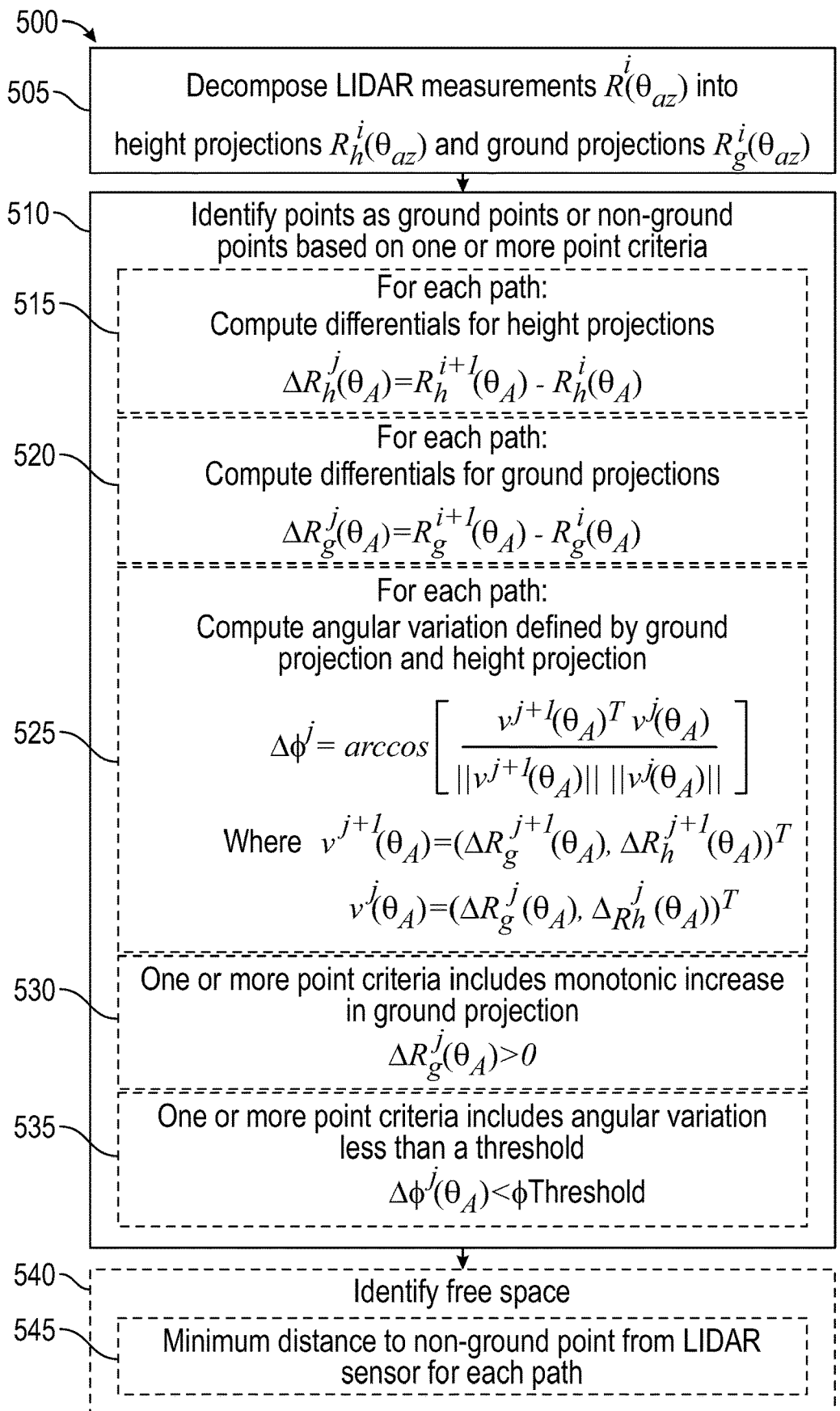
FIG. 5 illustrates an exemplary process of processing LiDAR data to detect ground and/or free space according to examples of the disclosure.

FIG. 5 illustrates an exemplary process 500 of processing LiDAR data to detect ground and/or free space according to examples of the disclosure. Process 500 can correspond to the processing and identification at 410, 415 in process 400 (e.g., performed by CPU 114 of on-board computer 110). At 505, the LiDAR data (e.g., measured by the scanning LiDAR sensor) can be decomposed into height projections and ground projections. Referring back to FIG. 2A, a measurement for a LiDAR channel at a specific azimuth angle, $R_{(\theta_{az})}^i$, can be decomposed into two projections, $$R_{h_{(\theta_{az})}}^i \text{ and } R_{g_{(\theta_{az})}}^i,$$

where $$R_{h_{(\theta_{az})}}^i$$

can represent me height projection and $$R_{g_{(\theta_{az})}}^i$$

can represent the ground projection.

$R^i_{h(\theta_{az})}$ and $R^i_{g(\theta_{az})}$ can be computed, for example, using the following equations:

$$R^i_{h(\theta_{az})} = R^i_{(\theta_{az})} \cdot \cos \theta^i_p$$

$$R^i_{g(\theta_{az})} = R^i_{(\theta_{az})} \cdot \sin \theta^i_p$$

At 510, range measurements can be identified as ground points or non-ground points based on one or more point criteria. Referring back to FIGS. 3A-3B, a path can be defined by range measurements from each LiDAR channel at a given azimuth angle and can be represented as a column in matrix 310. Identifying range measurements as ground points or non-ground points can include, at 515, computing differentials for height projection measurements along the path for each path (i.e., each fixed azimuth angle). The differentials for height projection measurements can be computed using the following equation:

$$\Delta R^j_{h(\theta_A)} = R^{j+1}_{h(\theta_A)} - R^j_{h(\theta_A)} \text{ where } \Delta R^j_{h(\theta_A)}$$

can represent the differentials for height projection measurements (indexed to j, for j=1 to j=N−1 for an N LiDAR channel system), where each differential is computed by subtracting the height projection measurement along the path between two adjacent LiDAR channels. Identifying range measurements as ground points or non-ground points can also include, at 520, computing differentials for ground projection measurements along the path for each path (i.e., each fixed azimuth angle). The differentials for ground projection measurements can be computed using the following equation:

$$\Delta R^j_{g(\theta_A)} = R^{j+1}_{g(\theta_A)} - R^j_{g(\theta_A)} \text{ where } \Delta R^j_{g(\theta_A)}$$

can represent the differentials for ground projection measurements (indexed to j, for j=1 to j=N−1 for an N LiDAR channel system), where each differential is computed by subtracting the ground projection measurement along the path between two adjacent LiDAR channels.

Identifying range measurements as ground points or non-ground points can also include, at 525, computing an angular variation along the path for each path (i.e., each fixed azimuth angle). The angular variation between two vectors along a path can be computed using the following equation:

$$\Delta \phi^j = \cos^{-1} \frac{(v^{j+1}_{(\theta_A)})^T (v^j_{(\theta_A)})}{\|v^{j+1}_{(\theta_A)}\| \|v^j_{(\theta_A)}\|}$$

where $\Delta \phi^j$ can represent the angular variation between two vectors $v_{(\theta_A)}^{j+1}$ and $v_{(\theta_A)}^{j}$ for a path corresponding to $\theta_A$. Vectors $v_{(\theta_A)}^{j+1}$ and $v_{(\theta_A)}^{j}$ can be defined by the following equations:

$$v^{j+1}_{(\theta_A)} = \left( \Delta R^{j+1}_{g(\theta_A)}, \Delta R^{j+1}_{h(\theta_A)} \right)^T$$

$$v^j_{(\theta_A)} = \left( \Delta R^j_{g(\theta_A)}, \Delta R^j_{h(\theta_A)} \right)^T$$

Identifying range measurements as ground points or non-ground points can also include determining whether the range measurements satisfy one or more point criteria. The one or more point criteria can include ground projection criterion and an angular variation criterion. With respect to the ground projection criterion, the processing can include determining, at 530, whether the ground projection differential corresponds to a positive increase along the path extending away from the LiDAR sensor. LiDAR measurements of a ground plane are expected to have distances along a path that monotonically increase moving away from the LiDAR sensor. In accordance with the ground projection differential between two adjacent range measurements being zero or negative, the range measurement $$R^i_{g(\theta_A)}$$

can fail to satisfy the ground projection criterion and be identified as a non-ground point. In accordance with the ground projection differential between two adjacent range measurements being non-zero and positive, the range measurement $$R^i_{g(\theta_A)}$$

can satisfy the ground projection criterion of the one or more point criteria to be identified as a ground point. In some examples, the ground projection criterion can compare the ground projection differential to a threshold rather than zero (e.g., a positive, non-zero number). The threshold can be determined empirically based on data collected by scanning LiDAR sensors under various real-world driving conditions.

With respect to the angular variation criterion, the processing can include determining, at 535, whether the angular variation between two vectors along the path is less than an angular variation threshold. In accordance with the angular variation between two vectors along a path being less than a threshold, the angular variation criterion of the one or more point criteria can be satisfied to identify the range measurement $$R^i_{g(\theta_A)}$$

as a ground point. The angular variation being less than the threshold can indicate gradual changes or little slope between ground projections along a path, which in turn can indicate a ground plane. In accordance with the angular variation between two vectors along a path being at or greater than the threshold, the angular variation criterion can fail to be satisfied and the range measurement $$R^i_{g(\theta_A)}$$

can be identified as a non-ground point. The angular variation being at or greater than the threshold can indicate rapid changes or large slope between ground projections along a path, which in turn can indicate an object/hazard along the path. The angular variation threshold can be determined empirically based on data collected by scanning LiDAR sensors corresponding to obstacle/hazard-free ground planes and obstacle/hazard-present ground planes under various real-world driving conditions.

Figure 6A:
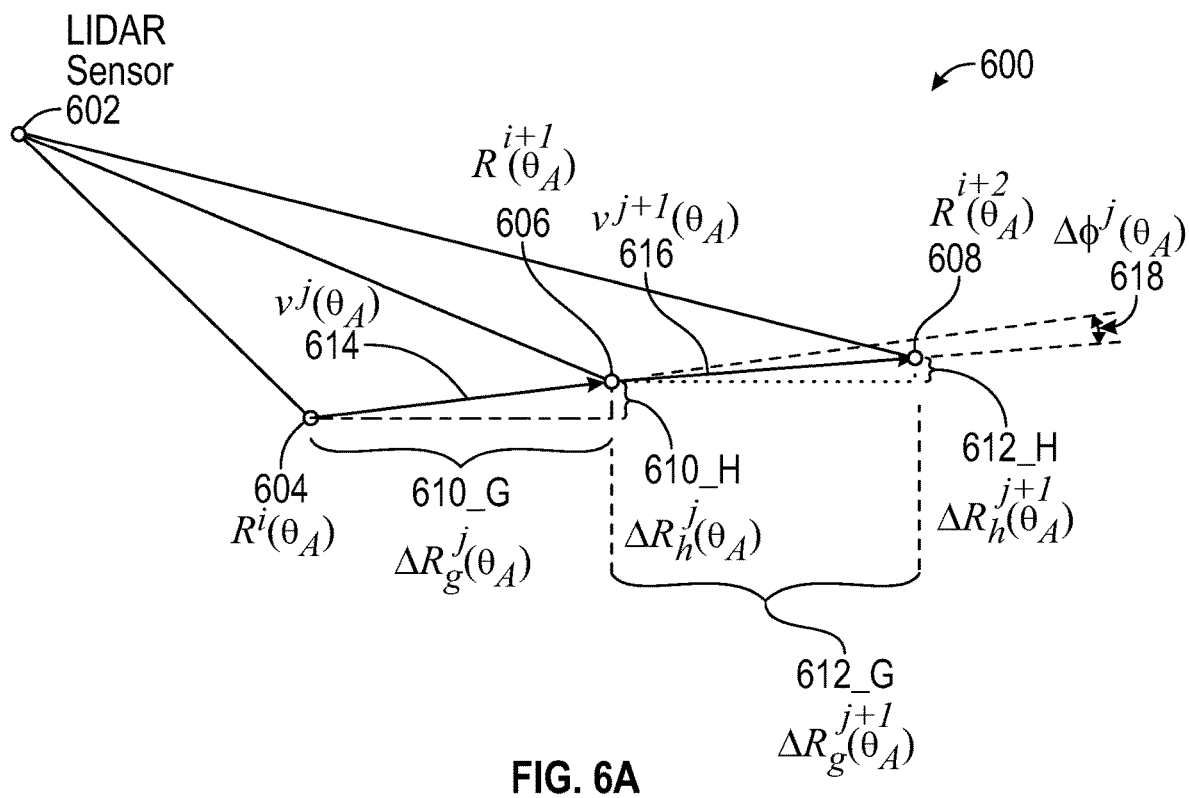
FIGS. 6A-6B illustrate visual representations of computations of an exemplary process of processing LiDAR data according to examples of the disclosure.

FIG. 6A illustrates a visual representation 600 of computations at 515, 520 and 525 of process 500 for one path (corresponding to one azimuth angle) according to examples of the disclosure. LiDAR sensor 602 can transmit laser light, receive reflected laser light, and measure range data for each LiDAR channel. In visual representation 600 of FIG. 6A, the three LiDAR channels can produce three range measurements 604, 606 and 608 at a specific azimuth angle, $\theta_A$: $R_{(\theta_A)}^i$, $R_{(\theta_A)}^{i+1}$, $R_{(\theta_A)}^{i+2}$. The range measurements 604, 606 and 608 can be decomposed (e.g., at 505 of process 500) into height projection measurements and ground projection measurements. Differentials 610_H, 612_H for height projection measurements can be computed (e.g., at 515 of process 500) by subtracting the height projection measurements between two adjacent LiDAR channels:

$$\Delta R_{h(\theta_A)}^j = R_{h(\theta_A)}^{i+1} - R_{h(\theta_A)}^i \text{ and } \Delta R_{h(\theta_A)}^{j+1} = R_{h(\theta_A)}^{i+2} - R_{h(\theta_A)}^{i+1}.$$

Likewise, differentials 610_G, 612_G for ground projection measurements can be computed (e.g., at 520 of process 500) by subtracting the ground projection measurements between two adjacent LiDAR channels:

$$\Delta R_{g(\theta_A)}^j = R_{g(\theta_A)}^{i+1} - R_{g(\theta_A)}^i \text{ and } \Delta R_{g(\theta_A)}^{j+1} = R_{g(\theta_A)}^{i+2} - R_{g(\theta_A)}^{i+1}.$$

The ground projection criterion can be evaluated based on the ground differentials. As illustrated in FIG. 6A, differential 610_G is positive and greater than zero (or a different positive, non-zero threshold) and differential 612_G is positive and greater than zero (or a different positive, non-zero threshold). As a result, range measurements 604 and 606 can satisfy the ground projection criterion to be identified as ground points. Vector $v_{(\theta_A)}^j$ 614 can be formed from $$\Delta R_{g(\theta_A)}^j \text{ and } \Delta R_{h(\theta_A)}^j$$

and vector $v_{(\theta_A)}^{j+1}$ 616 can be formed from $$\Delta R_{g(\theta_A)}^{j+1} \text{ and } \Delta R_{h(\theta_A)}^{j+1}.$$

The angular variation 618 between vectors 614 and 616 can be computed (e.g., at 525 of process 500). In accordance with angular variation 618 being less than the angular variation threshold, range measurement 604 (and the points between range measurements 604 and 606) can satisfy the angular variation criteria to be identified as a ground point. In accordance with angular variation 618 being at or greater than the angular variation threshold, range measurement 604 (and the points between range measurements 604 and 606) can fail to satisfy the angular variation criteria to be identified as a ground point (i.e., and can be identified as a non-ground point).

In some examples, the processing can be repeated for each range measurements along each path to identify ground points that satisfy the one or more point criteria (including the ground projection criterion and the angular variation criterion) and to identify non-ground points when the one or more point criteria are not satisfied (e.g., either the ground projection criterion or the angular variation criterion is not satisfied).

Returning to FIG. 5, in process 500 at 540, free space can be identified based on the identification of range measurements as ground points and non-ground points. For example, the minimum distance from the LiDAR sensor to a non-ground point along each path can be determined, at 545, to be free space.

Figure 6B:
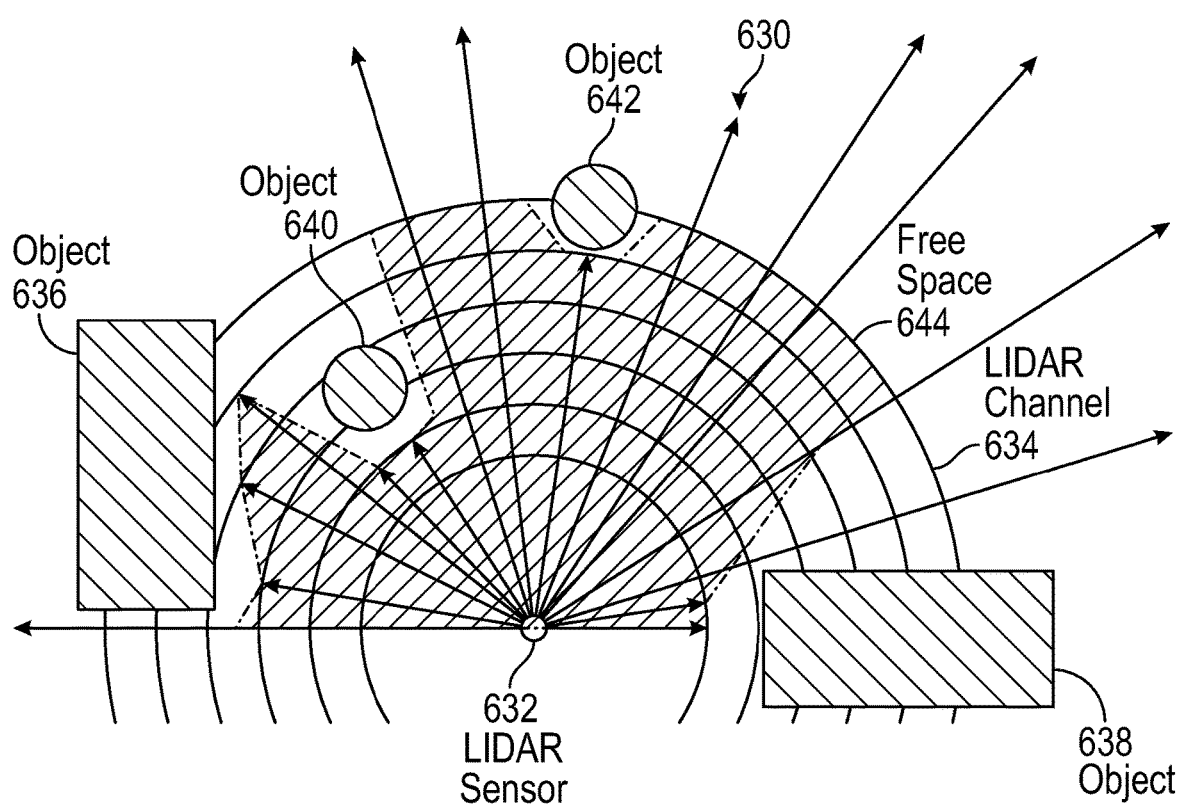

FIG. 6B illustrates a visual representation 630 of computations at 540 of process 500 according to examples of the disclosure. In visual representation 630 of FIG. 6B, each LiDAR channel 634 of LiDAR sensor 632 can be represented by an arc. Visual representation 630 also shows arrows (e.g., corresponding to different azimuth directions) extending from LiDAR sensor 632 to the minimum distance from the LiDAR to the closest non-ground point along the path. The presence of objects or hazards 636, 638, 640 and 642 (e.g., vehicles, pedestrians, etc.) can result in the identification of a non-ground point for a LiDAR channel at azimuth angles intersecting with one of the objects (illustrated by the termination of arrows at arcs with a non-ground point.) The absence of objects or hazards can result in the identification ground points at azimuth angles not intersecting with one of the objects (illustrated by the arrows extending beyond the illustrated arcs). A free-space region 644 can be defined within the minimum distances, at the various azimuth angles, to a non-ground point. Commands can be generated to allow for autonomous navigation and/or autonomous parking within the free-space so as to avoid the objects.

It should be understood that the flow of process 500 is exemplary and modifications are possible (e.g., to improve LiDAR data processing performance). For example, the decomposition of LiDAR data into height projection measurements and ground projection measurements at 515 and 520 can be performed in parallel rather than in series. Additionally or alternatively, the ground point and non-ground point identification process at 510 may be performed for fewer than all paths/azimuth angles. For example, a 360° LiDAR sensor with a 1° azimuth resolution may generate 360 paths. However, in some examples, rather than computing differentials and angular variations for each of these 360 paths, a subset of paths can be processed to identify ground points and non-ground points. The subset of paths may be selected based on the geometry of the vehicle (i.e., the clearance required for the vehicle to safely proceed and the direction of travel). For example, if one or more points along two non-adjacent paths are identified as non-ground points (fail to meet the one or more point criteria) and the separation between the two non-adjacent paths is not large enough for the vehicle to safely pass, then the processing of the intervening paths to identify ground and non-ground points can be skipped (because even if these paths might be free space, they are not part of a viable navigation route for the vehicle). Thus, the processing to identify ground points may first be applied to every n paths (e.g., where n is an integer greater than 1 selected based on at least the geometry of the vehicle), and then processing the intervening paths can be forgone between paths with non-ground points identified in the first processing. In some examples, the intervening paths between clear paths (without non-ground points) identified in the first path processing can be processed to identify ground and non-ground points (and potentially additional clear paths). In some examples, the subset of paths may be selected based on the direction of navigation. For example, each path with a range of azimuth angles (e.g., ±20° from the direction of travel) may be processed because the direction of travel may be particularly sensitive to the presence of hazards/objects. Paths outside the range of azimuth angles from the direction of travel may be processed, as described above, for every n paths (or may not be processed at all, e.g., if there is a clear path forward for the range of the azimuth angles in the direction of travel).

Additionally or alternatively, the computations and evaluations of the one or more point criteria may be performed in a different order than described above. In some examples, the computations of height projections (at 515), ground projections (at 520) and angular variations (at 525) can occur, and after these computations, the ground projection criterion and angular variation criterion can be evaluated (at 530 and 535, respectively). In some examples, the ground projection criterion at 530 can be evaluated for each path after first computing ground projections (at 520) to identify non-ground points and potential ground points (subject to the evaluation of the angular variation criterion). The angular variation criterion then can be evaluated (at 535) based on computed angular variations for paths for which no non-ground points were identified by the evaluation of the ground projection criterion. The angular variation and evaluation can be foregone for those paths with non-ground points.

Additionally or alternatively, the computations and evaluations of the one or more point criteria may proceed outward from the LiDAR sensor until a non-ground point is encountered for each path. For example, the evaluation of the ground projection criterion and/or the angular variation criterion can be performed for LiDAR channel 1 (channel nearest to the LiDAR sensor). For paths identifying a ground point for the range measurement of LiDAR channel 1, the evaluation of the ground projection criterion and/or the angular variation criterion can be performed for the range measurement of LiDAR channel 2. For paths identifying a non-ground point for the range measurement of LiDAR channel 1, the evaluation of the ground projection criterion and/or the angular variation criterion can halted without being performed for the range measurement of LiDAR channel 2. Likewise for each path, the evaluation of the ground projection criterion and/or the angular variation criterion can be performed for each range measurement along a path until a non-ground point is encountered.

Therefore, according to the above, some examples of the disclosure are directed to a system (e.g., configured to be incorporated into a vehicle). The system can comprise one or more light detection and ranging (LiDAR) sensors comprising one or more LiDAR channels and one or more processors coupled to the one or more LiDAR sensors. The processor can be configured to process ranging data from the one or more LiDAR sensors, the ranging data including a plurality of range measurements. Processing the ranging data can comprise identifying one or more of the plurality of range measurements as ground points or non-ground points based on one or more point criteria. The one or more point criteria can comprise a ground projection criterion and an angular variation criterion. Additionally or alternatively to one or more of the examples disclosed above, in some examples, the one or more processors can be further configured to: generate navigation commands for the vehicle in accordance with the identification of a subset of the ranging data as ground points or non-ground points. Additionally or alternatively to one or more of the examples disclosed above, in some examples, each range measurement of the plurality of range measurements can correspond to one of the one or more LiDAR channels and to one of a plurality of azimuth angles. Additionally or alternatively to one or more of the examples disclosed above, in some examples, processing the ranging data can comprise decomposing the ranging data into height projection data and ground projection data. Additionally or alternatively to one or more of the examples disclosed above, in some examples, identifying one or more of the plurality of range measurements as ground points or non-ground points can comprise, for each respective path comprising a range measurement for each of the one or more LiDAR sensors at an azimuth angle of the respective path: computing differentials of the ground projection data between the adjacent LiDAR channels of the one or more LiDAR channels. Additionally or alternatively to one or more of the examples disclosed above, in some examples, the ground projection criterion can be satisfied for a range measurement when the ground differential is greater than zero. Additionally or alternatively to one or more of the examples disclosed above, in some examples, identifying one or more of the plurality of range measurements as ground points or non-ground points can comprise, for each respective path: computing differentials of the height projection data between adjacent LiDAR channels of the one or more LiDAR channels. Additionally or alternatively to one or more of the examples disclosed above, in some examples, identifying one or more of the plurality of range measurements as ground points or non-ground points can comprise, for each respective path: computing angular variations along the respective path using the differentials of the height projection data and the differentials of the ground projection data. Additionally or alternatively to one or more of the examples disclosed above, in some examples, the angular variation criterion can be satisfied when an angular variation along the path is less than an angular variation threshold. Additionally or alternatively to one or more of the examples disclosed above, in some examples, the one or more processors can be further configured to: identify free space based on the minimum distance along one or more paths to one or more non-ground points. Each respective path of the one or more paths can comprise a range measurement for each of the one or more LiDAR sensors at an azimuth angle of the respective path.

Some examples of the disclosure are directed to a method. The method can comprise processing ranging data from one or more light detection and ranging (LiDAR) sensors, the LiDAR sensors comprising one or more LiDAR channels, the ranging data including a plurality of range measurements. Processing the ranging data can comprise: identifying one or more of the plurality of range measurements as ground points or non-ground points based on one or more point criteria. The one or more point criteria can comprise a ground projection criterion and an angular variation criterion. Additionally or alternatively to one or more of the examples disclosed above, in some examples, the method can further comprise generating navigation commands for the vehicle in accordance with the identification of a subset of the ranging data as ground points or non-ground points. Additionally or alternatively to one or more of the examples disclosed above, in some examples, each range measurement of the plurality of range measurements can correspond to one of the one or more LiDAR channels and to one of a plurality of azimuth angles. Additionally or alternatively to one or more of the examples disclosed above, in some examples, processing the ranging data comprises decomposing the ranging data into height projection data and ground projection data. Additionally or alternatively to one or more of the examples disclosed above, in some examples, identifying one or more of the plurality of range measurements as ground points or non-ground points can comprise, for each respective path comprising a range measurement for each of the one or more LiDAR sensors at an azimuth angle of the respective path: computing differentials of the ground projection data between the adjacent LiDAR channels of the one or more LiDAR channels. Additionally or alternatively to one or more of the examples disclosed above, in some examples, the ground projection criterion can be satisfied for a range measurement when the ground differential is greater than zero. Additionally or alternatively to one or more of the examples disclosed above, in some examples, identifying one or more of the plurality of range measurements as ground points or non-ground points can comprise, for each respective path: computing differentials of the height projection data between adjacent LiDAR channels of the one or more LiDAR channels. Additionally or alternatively to one or more of the examples disclosed above, in some examples, identifying one or more of the plurality of range measurements as ground points or non-ground points can comprise, for each respective path: computing angular variations along the respective path using the differentials of the height projection data and the differentials of the ground projection data. Additionally or alternatively to one or more of the examples disclosed above, in some examples, the angular variation criterion can be satisfied when an angular variation along the path is less than an angular variation threshold. Additionally or alternatively to one or more of the examples disclosed above, in some examples, the method can further comprise: identifying free space based on the minimum distance along one or more paths to one or more non-ground points. Each respective path of the one or more paths can comprise a range measurement for each of the one or more LiDAR sensors at an azimuth angle of the respective path.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system configured to be incorporated into a vehicle, the system comprising:
   one or more light detection and ranging (LiDAR) sensors comprising one or more LiDAR channels; and
   one or more processors coupled to the one or more LiDAR sensors, the processor configured to process ranging data from the one or more LiDAR sensors, the ranging data including a plurality of paths, each respective path comprising a range measurement for each of the one or more LiDAR sensor at an azimuth angle of the respective path, wherein processing the ranging data comprises:
      selecting a first subset of paths of the plurality of paths to include a pair of non-adjacent paths separated by a distance;
      selecting a second subset of paths of the plurality of paths;
      for each respective path of the first subset of paths:
         decomposing the range measurements into height projection data and ground projection data,
         identifying range measurements as ground points or non-ground points based on one or more point criteria by computing differentials of the height projection data and differentials of the ground projection data between adjacent LiDAR channels, wherein the one or more point criteria comprise a ground projection criterion and an angular variation criterion;
      for each respective path of the second subset of paths, foregoing decomposing the range measurements into height projection data and ground projection data, and foregoing identifying the range measurements as ground points or non-ground points; and
      in the event that the pair of non-adjacent paths are identified as ground points, selecting the first subset of paths to include one or more intervening paths between the pair of non-adjacent path;
      in the event that the pair of non-adjacent paths are identified as non-ground points, selecting the second subset of paths to include the one or more intervening paths between the pair of non-adjacent paths.

2. The system of claim 1, wherein the one or more processors are further configured to:
   generate navigation commands for the vehicle in accordance with the identification of a subset of the ranging data as ground points or non-ground points.

3. The system of claim 1, wherein the ground projection criterion is satisfied for a range measurement when the ground differential is greater than zero.

4. The system of claim 1, wherein identifying the range measurements as ground points or non-ground points comprises, for each respective path:
   computing angular variations along the respective path using the differentials of the height projection data and the differentials of the ground projection data.

5. The system of claim 4, wherein the angular variation criterion is satisfied when an angular variation along the path is less than an angular variation threshold.

6. The system of claim 1, wherein the one or more processors are further configured to:
   identify free space based on the minimum distance along one or more paths to one or more non-ground points.

7. A method comprising:
   processing ranging data from one or more light detection and ranging (LiDAR) sensors, the LiDAR sensors comprising one or more LiDAR channels, the ranging data including a plurality of paths, each respective path comprising a range measurement for each of the one or more LiDAR sensor at an azimuth angle of the respective path, wherein processing the ranging data comprises:
      selecting a first subset of paths of the plurality of paths to include a pair of non-adjacent paths separated by a distance;
      selecting a second subset of paths of the plurality of paths;
      for each respective path of the first subset of paths:
         decomposing the range measurements into height projection data and ground projection data;
         identifying range measurements as ground points or non-ground points based on one or more point criteria by computing differentials of the height projection data and differentials of the ground projection data between adjacent LiDAR channels, wherein the one or more point criteria comprise a ground projection criterion and an angular variation criterion;

for each respective path of the second subset of paths, foregoing decomposing the range measurements into height projection data and ground projection data, and foregoing identifying the range measurements as ground points or non-ground points;

in the event that the pair of non-adjacent paths are identified as ground points, selecting the first subset of paths to include one or more intervening paths between the pair of non-adjacent paths; and in the event that the pair of non-adjacent paths are identified as non-ground points, selecting the second subset of paths to include the one or more intervening paths between the pair of non-adjacent paths.

8. The method of claim 7, the method further comprising:
generating navigation commands for the vehicle in accordance with the identification of a subset of the ranging data as ground points or non-ground points.

9. The method of claim 7, wherein the ground projection criterion is satisfied for a range measurement when the ground differential is greater than zero.

10. The method of claim 7, wherein identifying the plurality of range measurements as ground points or non-ground points comprises, for each respective path: computing angular variations along the respective path using the differentials of the height projection data and the differentials of the ground projection data.

11. The method of claim 10, wherein the angular variation criterion is satisfied when an angular variation along the path is less than an angular variation threshold.

12. The method of claim 7, the method further comprising:
identifying free space based on the minimum distance along one or more paths to one or more non-ground points.

13. A non-transitory computer readable storage medium storing instructions, which when executed by one or more processors, cause the one or more processors to perform a method, the method comprising:
processing ranging data from one or more light detection and ranging (LiDAR) sensors, the LiDAR sensors comprising one or more LiDAR channels, the ranging data including a plurality of paths, each respective path comprising a range measurement for each of the one or more LiDAR sensor at an azimuth angle of the respective path, wherein processing the ranging data comprises:

selecting a first subset of paths of the plurality of paths to include a pair of non-adjacent paths separated by a distance;

selecting a second subset of paths of the plurality of paths;

for each respective path of the first subset of paths:
decomposing the range measurements into height projection data and ground projection data;
identifying the range measurements as ground points or non-ground points based on one or more point criteria by computing differentials of the height projection data and differentials of the ground projection data between adjacent LiDAR channels, wherein the one or more point criteria comprise a ground projection criterion and an angular variation criterion;

for each respective path of the second subset of paths, foregoing decomposing the range measurements into height projection data and ground projection data, and foregoing identifying the range measurements as ground points or non-ground points;

in the event that the pair of non-adjacent paths are identified as ground points, selecting the first subset of paths to include one or more intervening paths between the pair of non-adjacent paths; and in the event that the pair of non-adjacent paths are identified as non-ground points, selecting the second subset of paths to include the one or more intervening paths between the pair of non-adjacent paths.

14. The system of claim 1, wherein processing the range data further comprises:
determining a direction of navigation of the vehicle, and selecting the first subset of paths based on a comparison of the azimuth angle of each respective path of the plurality of paths to the direction of navigation.

15. The system of claim 7, wherein processing the range data further comprises:
determining a direction of navigation of the vehicle, and selecting the first subset of paths based on a comparison of the azimuth angle of each respective path of the plurality of paths to the direction of navigation.

* * * * *